Dec. 7, 1943.     S. W. ANDERSON     2,335,988
CAM FOLLOWER AND THE LIKE
Filed Nov. 21, 1942

Inventor:
Stanley W. Anderson,
by

Patented Dec. 7, 1943

2,335,988

UNITED STATES PATENT OFFICE 2,335,988

CAM FOLLOWER AND THE LIKE

Stanley W. Anderson, Western Springs, Ill.

Application November 21, 1942, Serial No. 466,510

2 Claims. (Cl. 74—569)

This invention relates to cam followers, and the like, but it will be apparent from a study of the disclosures hereinafter made that certain of the novel features herein shown are not limited to use in such devices, but are of more general application. Still, in view of the fact that said features have been especially devised to meet the conditions imposed in the operation of cam followers I shall illustrate and describe their application to this particular use. In so doing, however, I do not intend to limit myself, except as I may do so in the claims to follow.

These cam followers comprise the engaging elements which bear directly against and follow the surfaces of cams to transmit movements to other machine elements according to the control of the cam surfaces. Heretofore it has been customary to provide such cam followers with suitable anti-friction bearings, either roller or ball type, the cam engaging surface proper comprising either the outer raceway of such anti-friction bearing, or some element carried thereby. The inner race-way of the anti-friction bearing generally comprises the stud of the cam follower, which stud is engaged with the element to be cam operated.

During operation the outer raceway or flange which contacts the cam surface rotates very rapidly, especially when engaging the larger radii portions of the cam, and such rotation is necessarily accompanied by a correspondingly large centrifugal action. The lubricant for the anti-friction bearing is received within the space between the inner surface of the outer raceway and the stud surface, and this lubricant is therefore subjected to a maximum effect of such centrifugal tendency because said space is the maximum diameter within the bearing pocket. Such centrifugal tendency results in out throw of the lubricant, so that unless provision is made for retention of the lubricant in the bearing it will soon be discharged, by out-throw, and the bearing will run dry.

In the design of the cam follower assembly (including the stud, anti-friction bearing, and outer raceway or flange) it is necessary to make provision for retaining these parts in assembled relation; and for this purpose it has heretofore been known to provide inter-engaging elements in the form of flanges and shouldered parts with which said flanges engage, and heretofore these flanges have comprised portions of, or been directly attached to and carried by the stud, the said shouldered parts comprising portions of the outer raceway or flange which engages the cam during operation. Due to this circumstance, and in order to provide a workable assembly said shouldered parts and the flanges engaging therewith have been carried out beyond the anti-friction elements (rollers or balls), to a position of larger diameter, with the accompanying result that free working clearances have had to be provided between said parts at that location of larger diameter than the anti-friction bearings or parts being lubricated. In other words, this arrangement in which the shoulders have been provided on the outer raceway or flange, and the engaging portions secured to and comprising portions of, the stud has been subject to the requirement that free running clearances between these parts have been necessary at positions of diameter larger than the roller or ball receiving surfaces. The result has been that leakage of lubricant has occurred at these free running clearances, and this leakage has been greatly aggravated by the centrifugal pressures built up during rapid running of the parts. This has also made it necessary to make special provision for continuous or very frequent lubrication of such cam followers in order to prevent them from running dry; and also it has frequently happened that lubricant has been thrown from such cam followers out on to other parts or on to materials being fabricated.

It is the main object of the present invention to provide a design and construction of cam follower which completely avoids the foregoing objections, and which on the other hand provides a completely sealed or integrated centrifugal pocket wherein the lubricant is received from centrifugal action, and is retained at all times in direct contact with the rollers or balls of the bearing, or, in the case of a simple plain or bushed bearing, is retained in contact and engagement therewith at all times. To secure this result I so design and construct the outer or flange portion of the follower that there is provided an inwardly facing recessed annular pocket which accommodates the rollers or balls of the bearing, said pocket comprising a portion of the outer and rotating element of the cam follower, and being completely leak proof against any loss of lubricant therefrom by centrifugal action during running of the device; and then I provide suitable engaging elements or portions on the stud which engage with said outer or rotatable portion of the cam follower to retain same firmly in place on the stud. Thus the clearances necessary between the stud and the outer rotatable element, for free running of the parts, are brought to a diameter smaller than the roller or ball bearing raceways, and said raceway surfaces and the rollers or balls themselves are accommodated fully within such centrifugal pocket, and at a location of greater diameter than the aforesaid clearances needed for free running of the parts. With this arrangement, also, it is possible to provide what is in effect a packed bearing, or a self sealed bearing, which will retain its lubricant for a very long interval of running, and substantially without loss of lubricant or need of attention of any kind.

Since the free running clearances between the outer portion of the cam follower and the stud are located at a relatively small diameter position, and inside of the centrifugal pocket location, so that there is no tendency for centrifugal loss of lubricant during running, it follows that there is no need for very accurate machining of the parts at such clearances, since close tolerances are not required there. Thus my improved form of cam follower may be built more cheaply and with less use of fabricating machines, than is the case with heretofore known cam followers wherein it has been necessary to provide effective seals at free running clearances subject to the effect of the centrifugal action of high speeds. Furthermore, due to the face that in my improved construction said clearances are provided at positions of diameter smaller than the raceways of the anti-friction bearing it is possible in my improved construction to provide actual non-engaging clearances at such parts, so that they do not constantly run in contact with each other, thereby greatly reducing wear and need of accurate machining in the first instance.

Other objects and uses of the invention will appear from a detailed description of the same, which consists in the features of construction and combinations of parts hereinafter described and claimed.

Figure 3:
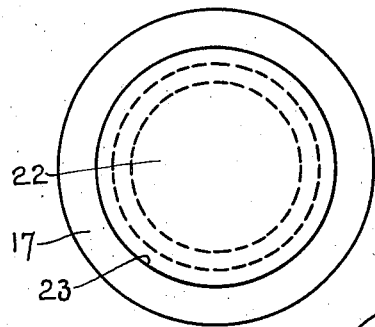
Figure 3 shows a top or end view of a cam follower of my present invention.
Figure 1:
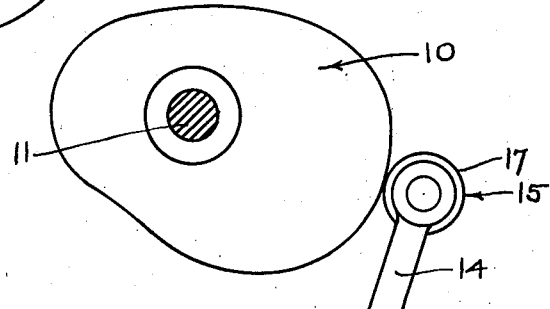
Figure 1 shows more or less schematically a simple application of a cam follower embodying my present invention to a simple form of cam movement.
Figure 4:
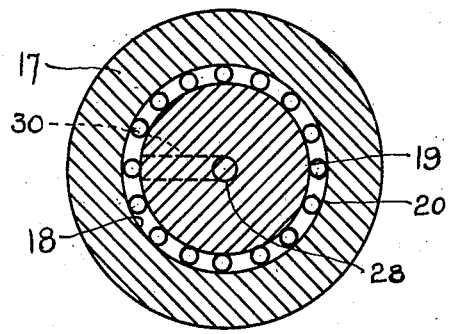
Figure 4 shows a cross-section on the line 4—4 of Figure 2 looking in the direction of the arrows.
Figure 2:
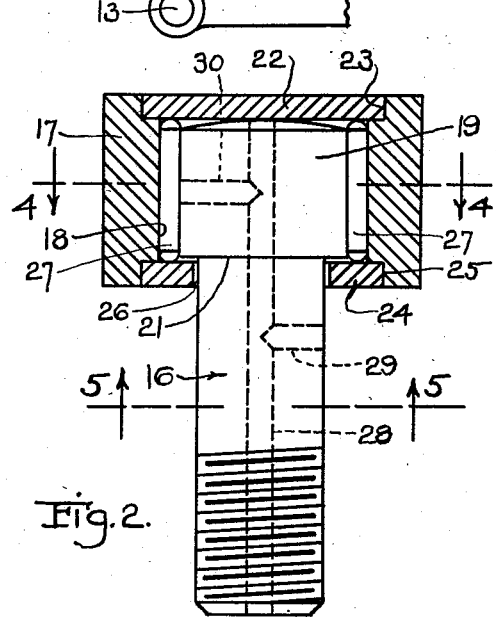
Figure 2 shows a longitudinal section through a cam follower assembly embodying my present invention.
Figure 5:
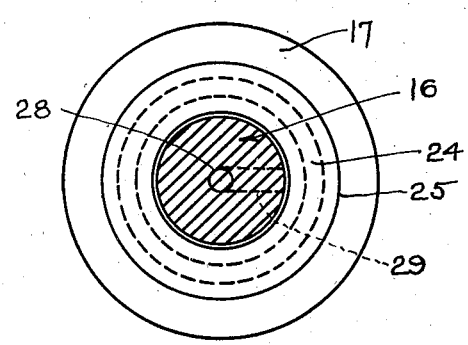
Figure 5 shows a cross-section on the line 5—5 of Figure 2 looking in the direction of the arrows.

Referring first to Figure 1, I have therein shown schematically the simple cam element 10 carried by the shaft 11, and rotating in the direction of the arrow. I have also shown adjacent to said parts the bell-crank 12, pivoted at the point 13. The arm 14 of this bell-crank is shown as having the cam follower assembly 15 at its free end, so that as the cam rotates the other arm of the bell-crank is compelled to execute movements as dictated by the cam. This is a simple application of my present invention, and is given merely by way of illustration, and not limitation. This cam follower assembly 15 constitutes the subject-matter of the present invention.

Referring to Figures 2, 3, 4 and 5, this assembly includes the stud 16, conveniently shown as being threaded to be attached to the bell-crank arm. The outer end of this stud carries the outer raceway or flange element 17 which is of generally cylindrical form, and preferably has its outer surface ground and hardened for engagement with the cam surface. The inner cylindrical surface 18 of this element 17 is preferably also ground and hardened to constitute the outer raceway of the anti-friction bearing. The end portion 19 of the stud is provided with a hardened cylindrical surface, and preferably constitutes the inner raceway of the bearing, being of size to leave the roller or ball receiving space 20 between the outer surface of the stud head and the inner surface 18 of the flange element 17.

I provide the head portion of the stud with a backwardly facing annular shoulder 21, this being possible since the head portion of the stud is of greater diameter than its shank or stem portion; and it is noted that said shank or stem portion is of smaller diameter than the inner raceway of the bearing, so that said shoulder 21 lies at all points within the projected cylinder of the inner raceway surface. The flange element 17 is closed opposite to the end of the stud head 19 by the portion 22 so that movement of the stud in that direction is prevented thereby. Such portion 22 might be an integral portion of the element 17; but good manufacturing and machining operations dictate that this portion 22 shall be set and secured to the portion 17 as a distinct element. This makes it possible to form, grind and polish the surface 18 very accurately and readily. Said portion 22 therefore generally takes the form of a circular plate set into an annular recess 23 formed in the end portion of the element 17; and said plate 22 may be put in with a tight fit, or a suitable form of locking device (not illustrated) may be used to hold it in place.

Evidently with the construction so far described it is possible to set the stud endwise into the element 17 (including the plate 22). Then the stud is locked in such position by setting the annular or ring element 24 into place over the stem of the stud and up relatively close to the shoulder 21. This ring element is accommodated within an annular recess 25 of the element 17; and said annular element 24 may be retained in place either by a press fit or by suitable locking means, not shown. It is especially noted that this fit should be oil tight, as is also the fit of the plate 22 at the shoulder 23, so that leakage of oil or lubricant cannot occur at these points, even under the centrifugal pressures generated by rapid running of the parts. It is also noted that the clearance between the ring element 24 and the stem of the stud (at 26) may be a complete clearance since there is not required any running engagement between these parts, so that accurate machine operations at this point are not required. It is also noted that the annular or ring element 24 comes to a radial position smaller than the head surface 19 of the stud, so that said annular or ring element locks the stud in place with respect to the element 17. It is also noted that with the parts thus assembled there is provided an annular recess or channeled pocket 26 around the stud head and within the element 17, said pocket being fully closed at one end by the plate 22, and being closed by the annular ring 24 at its other end; and it is noted that any lubricant will be thrown outwardly in said pocket by centrifugal running force. Due to the inwardly facing form of this pocket it is impossible for any lubricant to be thrown out from the space 20 by centrifugal tendency, and the higher the speed of rotation the more effectively will the lubricant be retained in place. It is further noted that there need be no running engagement between the shoulder 21 and the annular ring 24, since said ring need engage the shoulder only to retain the element 17 against removal from the stud; so these surfaces need not be highly finished or polished.

The pin rollers 27 are shown in the space 20, and between the surfaces 18 and 19. It is seen that these rollers run at all times with perfect lubrication since, as pointed out, no loss of lubricant can occur due to centrifugal tendency. If desired provision may be made for replenishment of lubricant from time to time, however, to either force in fresh lubricant, forcing out the older, or to replace old lubricant with fresh, or for other reasons. To this end I have shown the passages 28, 29 and 30 formed in the stud, and properly interconnected, so that such lubricant may be forced through them from a convenient fixture, for delivery of such lubricant into the space 20 wherein are accommodated the rollers or balls.

It is now noted that I have provided an annular inwardly facing recess or space between the outer or flange member 17 and the stud head 19, which recess extends to a position of diameter less than the diameter of the stud head, so that lubricant is effectively retained in said space against centrifugal tendency, and so that the rollers or balls of the anti-friction bearing are also retained in place. While the plate 22 is shown as comprising a circular non-perforated plate, it is evident that said plate might be in the form of an annular ring similar to the ring 24, and of similar radial dimension.

While I have herein shown and described only a single embodiment of the features of my present invention, still I do not intend to limit myself thereto except as I may do so in the claims to follow.

I claim:

1. A cam follower or the like comprising in combination a stud for attachment to a part to be cam operated, said stud having a cylindrical head of greater diameter than the stem of the stud, and providing a backwardly facing shoulder, the outer surface of said cylindrical head constituting an inner raceway of an anti-friction bearing, a circular running member surrounding said stud head and having an internal diameter greater than the diameter of the stud head and constituting an outer raceway of said anti-friction bearing, suitable anti-friction bearing members between said raceways a portion closing the outer end of said running member in lubricant tight fashion, together with an annular member connected to the running member and lying to the rear of said stud head shoulder and extending inwardly a sufficient distance to overlie said shoulder and having its outer peripheral portion in lubricant tight sealing fashion connected to said running member, said annular member having an internal diameter less than the diameter of the stud head, whereby said stud head is locked in position between the portion closing the outer end of the running member and said annular member, and whereby said running member, said closing portion, and said annular member serve to provide a lubricant tight inwardly facing recess around the stud head and around the anti-friction bearing elements, said recess reaching inwardly to a diameter less than the diameter of the stud head, and serving to retain lubricant against out throw by centrifugal action, substantially as described.

2. A cam follower or the like comprising in combination a stud for attachment to a part to be cam operated, said stud having a cylindrical head of greater diameter than the stem of the stud, and providing a backwardly facing shoulder, a circular running member surrounding said stud head and having an internal diameter greater than the diameter of said stud head, suitable anti-friction bearing members between the outer cylindrical surface of the stud head and the inner surface of the running member, a portion closing the outer end of said running member in lubricant tight fashion, together with an annular member connected to the running member and lying to the rear of said stud head shoulder and extending inwardly a sufficient distance to overlie said shoulder and having its outer peripheral portion in lubricant tight sealing fashion connected to said running member, said annular member having an internal diameter less than the diameter of the stud head, whereby said stud head is locked in position between the portion closing the outer end of the running member and said annular member, and whereby said running member, said closing portion, and said annular member serve to provide a lubricant tight inwardly facing recess around the stud head and around the anti-friction bearing elements, said recess reaching inwardly to a diameter less than the diameter of the stud head, and serving to retain lubricant against out throw by centrifugal action, substantially as described.

STANLEY W. ANDERSON.